United States Patent
Zhong

(10) Patent No.: US 11,122,484 B2
(45) Date of Patent: Sep. 14, 2021

(54) METHOD OF AUTOMATICALLY SWITCHING BETWEEN WLAN AND LTE NETWORKS AND COMMUNICATION TERMINAL

(71) Applicant: JRD Communication (Shenzhen) LTD., Shenzhen (CN)

(72) Inventor: Caijin Zhong, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/497,794

(22) PCT Filed: Mar. 29, 2018

(86) PCT No.: PCT/CN2018/081005
§ 371 (c)(1),
(2) Date: Sep. 26, 2019

(87) PCT Pub. No.: WO2018/177345
PCT Pub. Date: Oct. 4, 2018

(65) Prior Publication Data
US 2020/0252850 A1    Aug. 6, 2020

(30) Foreign Application Priority Data
Apr. 1, 2017  (CN) .......................... 201710212612.0

(51) Int. Cl.
*H04W 36/14* (2009.01)
*H04W 36/00* (2009.01)
*H04W 84/12* (2009.01)

(52) U.S. Cl.
CPC ....... *H04W 36/14* (2013.01); *H04W 36/0085* (2018.08); *H04W 36/00837* (2018.08); *H04W 84/12* (2013.01)

(58) Field of Classification Search
CPC ....... H04W 36/00837; H04W 36/0085; H04W 36/14
See application file for complete search history.

(56) References Cited

U.S. PATENT DOCUMENTS

| 7,693,184 | B2 | 4/2010 | Mathieu et al. |
| 2007/0091844 | A1* | 4/2007 | Huang ............ H04W 36/00837 370/331 |

(Continued)

FOREIGN PATENT DOCUMENTS

| CN | 101626612 | 1/2010 |
| CN | 102595544 | 7/2012 |

(Continued)

OTHER PUBLICATIONS

Ghanem et al.; "A Timer based on Overlapping Area for Avoiding Ping-Pong Handover in LTE Networks"; International Journal of Engineering Research & Technology (IJERT) ISSN: 2278-0181 TITCON-2015 Conference Proceedings (Year: 2015).*

(Continued)

*Primary Examiner* — Gary Mui

(57) ABSTRACT

Disclosed are a method of automatically switching between WLAN and LTE networks and communication terminal. The method comprises: receiving measurement parameters of signals reported by WLAN and LTE networks; acquiring preset information of network priorities, the network priorities being used to indicate a preferential network used for bearing communication services when WLAN and LTE networks co-exist; and performing a switching operation according to the measurement parameters of signals and the preset information of the network priorities.

15 Claims, 4 Drawing Sheets

(56) References Cited

U.S. PATENT DOCUMENTS

| | | | | |
|---|---|---|---|---|
| 2008/0244095 | A1* | 10/2008 | Vos | H04L 47/70 |
| | | | | 709/250 |
| 2008/0254797 | A1* | 10/2008 | Achtari | H04W 36/00837 |
| | | | | 455/436 |
| 2009/0104909 | A1* | 4/2009 | Vesely | H04W 36/08 |
| | | | | 455/436 |
| 2013/0040693 | A1 | 2/2013 | Chen et al. | |
| 2013/0077482 | A1* | 3/2013 | Krishna | H04W 36/22 |
| | | | | 370/230 |
| 2014/0162656 | A1* | 6/2014 | Chai | H04W 48/16 |
| | | | | 455/437 |
| 2014/0187252 | A1* | 7/2014 | Gupta | H04W 72/0486 |
| | | | | 455/450 |
| 2015/0031367 | A1* | 1/2015 | Singh | H04L 43/0882 |
| | | | | 455/437 |
| 2015/0163704 | A1* | 6/2015 | Catovic | H04W 36/0038 |
| | | | | 370/331 |
| 2016/0014664 | A1* | 1/2016 | Singh | H04L 5/00 |
| | | | | 370/332 |
| 2016/0066225 | A1* | 3/2016 | Zhu | H04W 36/00837 |
| | | | | 455/437 |
| 2016/0316397 | A1* | 10/2016 | Pantelidou | H04W 48/02 |
| 2018/0091581 | A1 | 3/2018 | Yu et al. | |

FOREIGN PATENT DOCUMENTS

| | | |
|---|---|---|
| CN | 103546933 | 1/2014 |
| CN | 103634921 | 3/2014 |
| CN | 104349411 | 2/2015 |
| CN | 105163355 | 12/2015 |
| CN | 105939381 | 9/2016 |
| CN | 107124742 | 9/2017 |
| WO | WO 2006/040423 | 4/2006 |
| WO | WO 2018/177345 | 10/2018 |

OTHER PUBLICATIONS

Kim et al.; "Ping-Pong Avoidance Algorithm for Vertical Handover in Wireless Overlay Networks"; Published in: 2007 IEEE 66th Vehicular Technology Conference Date of Conference: Sep. 30-Oct. 3, 2007 Date Added to IEEE Xplore: Oct. 15, 2007 (Year: 2007).*
International Search Report and the Written Opinion dated International Searching Authority Re. Application No. PCT/CN2018/081005 and Its Translation of Search Report Into English. (10 Pages).

* cited by examiner

METHOD OF AUTOMATICALLY SWITCHING BETWEEN WLAN AND LTE NETWORKS AND COMMUNICATION TERMINAL

RELATED APPLICATIONS

This application is a National Phase of PCT Patent Application No. PCT/CN2018/081005 having International filing date of Mar. 29, 2018, which claims the benefit of priority of Chinese Patent Application No. 201710212612.0 filed on Apr. 1, 2017. The contents of the above applications are all incorporated by reference as if fully set forth herein in their entirety.

FIELD AND BACKGROUND OF THE INVENTION

The present disclosure relates to a mobile communication technology, and more particularly, a method for automatically switching between wireless local area network (WLAN) and long term evolution (LTE) network and a related mobile terminal.

The coverage of the LTE network becomes more and more complete all over the world. Thus, the IP multimedia subsystem (IMS) communication service provided by the LTE network is developed rapidly. However, the communication service quality LTE network is not that good in enclosed environments, such as basements, subways, or buildings. Further, the improvement of the LTE network in these areas is not technically easy and costs a lot. In contrast, the WLAN network has a better coverage and communication quality in these enclosed environments. Currently, a LTE wireless router could connect a WLAN terminal to a mobile internet to broaden the coverage of the WLAN network. However, currently, the switch between WLAN network and LTE network often relies on a predetermined information of a network priority. For example, the predetermined information could preset to use the WLAN network first to provide IMS communication service. If the communication terminal enters an open area from an enclosed environment, the LTE network becomes better than the WLAN network but the WLAN network still provides the communication service. This not only influences the communication service quality, but also increases the time for connecting to a network and decrease the network connection efficiency.

SUMMARY OF THE INVENTION

The technical issue that a preferred embodiment of the present disclosure solves is to provide a method for automatically switching between WLAN network and LTE network and related communication terminal, capable of selecting a better one of the WLAN network and the LTE network to provide IMS communication service. This ensures the communication service quality and raises the network connection efficiency.

According to an embodiment of the present disclosure, a method for automatically switching between Wireless Local Area Network (WLAN) network and Long Term Evolution (LTE) network comprises:

periodically receiving a signal measurement parameter reported by a WLAN network and a signal measurement parameter reported by a LTE network, wherein the signal measurement represents a signal quality, and the WLAN network reports the signal measurement parameter more frequently than the LTE network;

obtaining a predetermined information of a network priority, wherein the network priority identifies which one of the WLAN network and the LTE network should be used to provide a communication service, the predetermined information comprises one of a first predetermined information, a second predetermined information and a third predetermined information, the first predetermined information is to use one which has a better signal quality to provide the communication service, the second predetermined information is to first use the WLAN network to provide the communication service, the third information is to first use the LTE network to provide the communication service;

in a condition that the predetermined information is the first predetermined information, comparing the signal measurement parameter of the WLAN network with the signal measurement parameter of the LTE network; generating a switching command to use the WLAN network to provide the communication service if the signal measurement parameter of the WLAN network is larger than the signal measurement parameter of the LTE network; and generating a switching command to use the LTE network to provide the communication service if the signal measurement parameter of the WLAN network is smaller than the signal measurement parameter of the LTE network;

in a condition that the predetermined information is the second predetermined information, comparing the signal measurement parameter of the WLAN network with a first predetermined threshold; if the signal measurement parameter of the WLAN network is larger than or equal to the first predetermined threshold, then generating a switching command to use the WLAN network to provide the communication service; if the signal measurement parameter of the WLAN network is smaller than the first predetermined threshold, then comparing the signal quality of the WLAN network with the signal quality of the LTE network; generating the switching command to use the WLAN network to provide the communication service if the signal measurement parameter of the WLAN network is larger than the signal measurement parameter of the LTE network; and generating the switching command to use the LTE network to provide the communication service if the signal measurement parameter of the WLAN network is smaller than the signal measurement parameter of the LTE network; and in a condition that predetermined information is the third predetermined information, comparing the signal measurement parameter of the LTE network with a second predetermined threshold; if the signal measurement parameter of the LTE network is larger than or equal to the second predetermined threshold, then generating a switching command to use the LTE network to provide the communication service; if the signal measurement parameter of the LTE network is smaller than the second predetermined threshold, then comparing the signal quality of the WLAN network with the signal quality of the LTE network; generating the switching command to use the WLAN network to provide the communication service if the signal measurement parameter of the WLAN network is larger than the signal measurement parameter of the LTE network; and generating the switching command to use the LTE network to provide the communication service if the signal measurement parameter of the WLAN network is smaller than the signal measurement parameter of the LTE network.

According to another embodiment of the present disclosure, a method for automatically switching between Wireless Local Area Network (WLAN) network and Long Term Evolution (LTE) network is disclosed. The method comprises: receiving a signal measurement parameter reported by a WLAN network and a signal measurement parameter reported by a LTE network, wherein the signal measurement represents a signal quality; obtaining a predetermined information of a network priority, wherein the network priority identifies which one of the WLAN network and the LTE network should be used to provide a communication service; and performing a switching operation according to the signal measurement parameter of the WLAN network, the signal measurement parameter of the LTE network, and the predetermined information such that one of the WLAN network and the LTE network is selected to provide the communication service.

According to still another embodiment of the present disclosure, a communication terminal for automatically switching between Wireless Local Area Network (WLAN) network and Long Term Evolution (LTE) network is disclosed. The communication terminal comprises: a transceiver, configured to receive a signal measurement parameter reported by a WLAN network and a signal measurement parameter reported by a LTE network, wherein the signal measurement represents a signal quality; a storage device, configured to store a predetermined information of a network priority, wherein the network priority identifies which one of the WLAN network and the LTE network should be used to provide a communication service; and a processor, coupled to the transceiver and the storage device, configured to perform a switching operation according to the signal measurement parameter of the WLAN network, the signal measurement parameter of the LTE network, and the predetermined information in order to select one of the WLAN network and the LTE network to provide the communication service.

In contrast to the prior art, the present disclosure utilizes the signal measurement parameters of the WLAN network and LTE network as a reference to switch the network based on the predetermined information of a network priority. That is, the current network conditions are evaluated as a reference to automatically select one of the WLAN network and the LTE network to provide the communication service (ex: IMS communication service). This ensures the communication service quality and raises the network connection efficiency.

DESCRIPTION OF SPECIFIC EMBODIMENTS OF THE INVENTION

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, but is not intended to limit the present disclosure.

Figure 1:
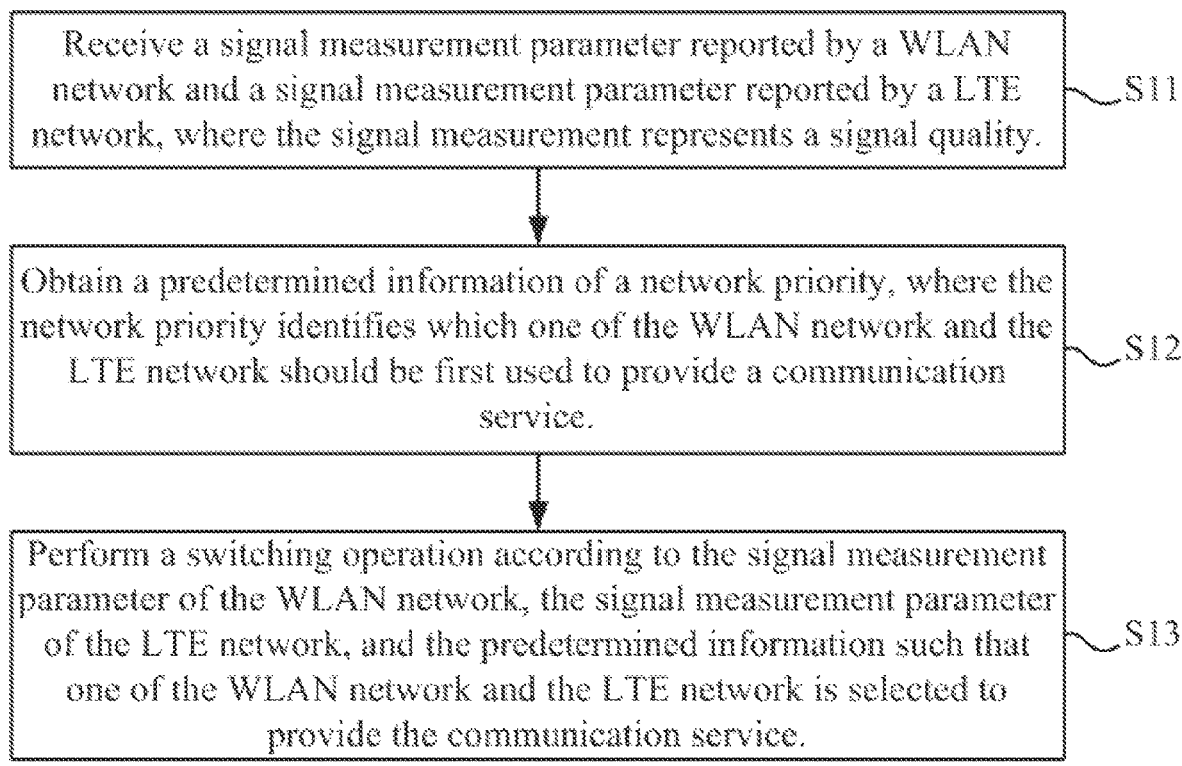
FIG. 1 is a flow chart showing a method for automatically switching the WLAN network and the LTE network according to a first embodiment of the present disclosure.

Please refer to FIG. 1. FIG. 1 is a flow chart showing a method for automatically switching the WLAN network and the LTE network according to a first embodiment of the present disclosure. The method comprises following steps S11-S13.

S11: receive a signal measurement parameter reported by a WLAN network and a signal measurement parameter reported by a LTE network, wherein the signal measurement represents a signal quality.

In this embodiment, the WLAN network and the LTE network could periodically reports their signal measurement parameters. In an actual implementation, the coverage of the WLAN network is often smaller than the coverage of the LTE network. The communication terminal is easier to enter or leave the coverage of the WLAN network. This means that the communication terminal is more often in the coverage of the LTE network rather than the WLAN network. Therefore, in this embodiment, the WLAN network could report the signal measurement parameter more frequently than the LTE network, which means that the reporting period of the WLAN network is less than the reporting period of the LTE network.

Figure 2:
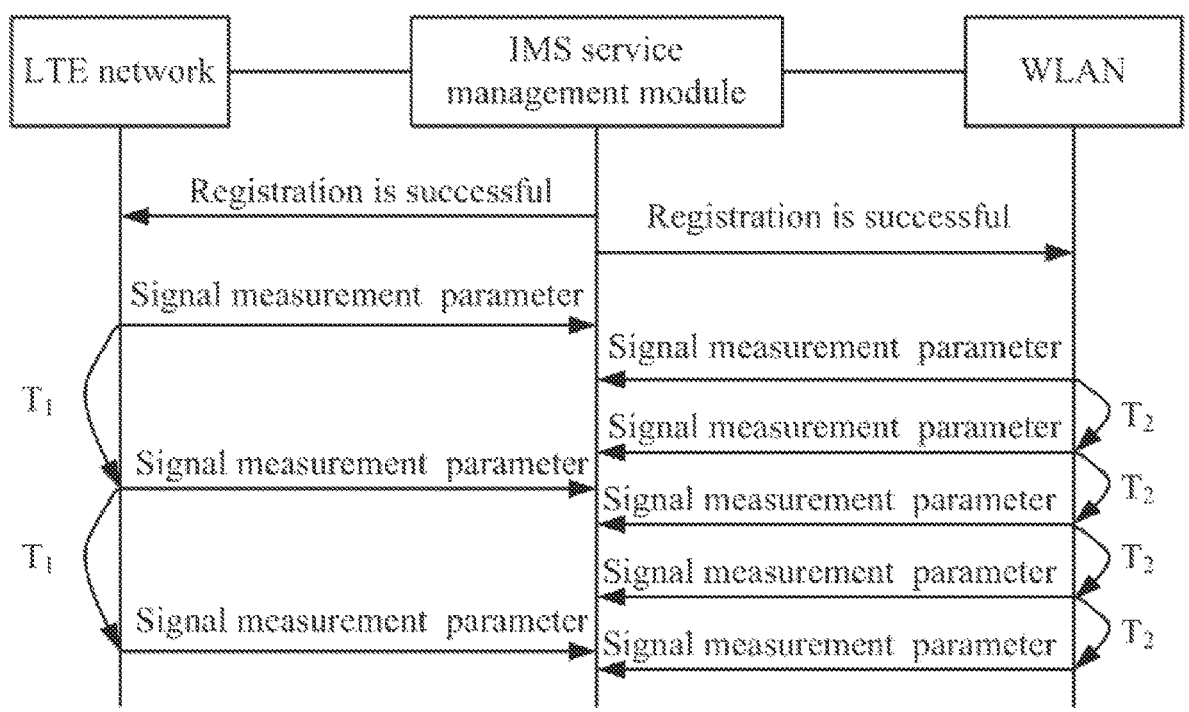
FIG. 2 is a flow chart showing that the WLAN network and the LTE network reports their signal measurement parameters according to another embodiment of the present disclosure.

Please refer to FIG. 1 in conjunction with FIG. 2. FIG. 2 is a flow chart showing that the WLAN network and the LTE network reports their signal measurement parameters according to another embodiment of the present disclosure. Using IMS communication service as an example, when the WLAN network and the LTE network receives receive a registration condition of the service management module and detects that the registration is successful, the LTE network sends a signal measurement parameter to the IMS service management module based on a reporting period T1. The WLAN network sends a signal measurement parameter to the IMS service management module based on a reporting period T2, wherein the period T2 is less than T1. In contrast, when registration condition shows that the registration is canceled, the WLAN network and the LTE network cease to report their signal measurement parameters.

The above-mentioned signal measurement parameter represents the signal quality of the network. For example, if the signal measurement parameter is greater, it means that the signal quality is better and thus the communication quality is better. Based on this, different types of networks could have different types of signal measurement parameters as long as they could represent signal qualities. For example, the signal measurement parameter of the LTE network could be a reference signal receiving power (RSRP) and a reference signal receiving quality (RSRQ). The signal measurement parameter of the WLAN network could be a received signal strength indicator (RSSI).

S12: obtain a predetermined information of a network priority, where the network priority identifies which one of the WLAN network and the LTE network should be first used to provide a communication service.

S13: perform a switching operation according to the signal measurement parameter of the WLAN network, the signal measurement parameter of the LTE network, and the predetermined information such that one of the WLAN network and the LTE network is selected to provide the communication service.

Figure 4:
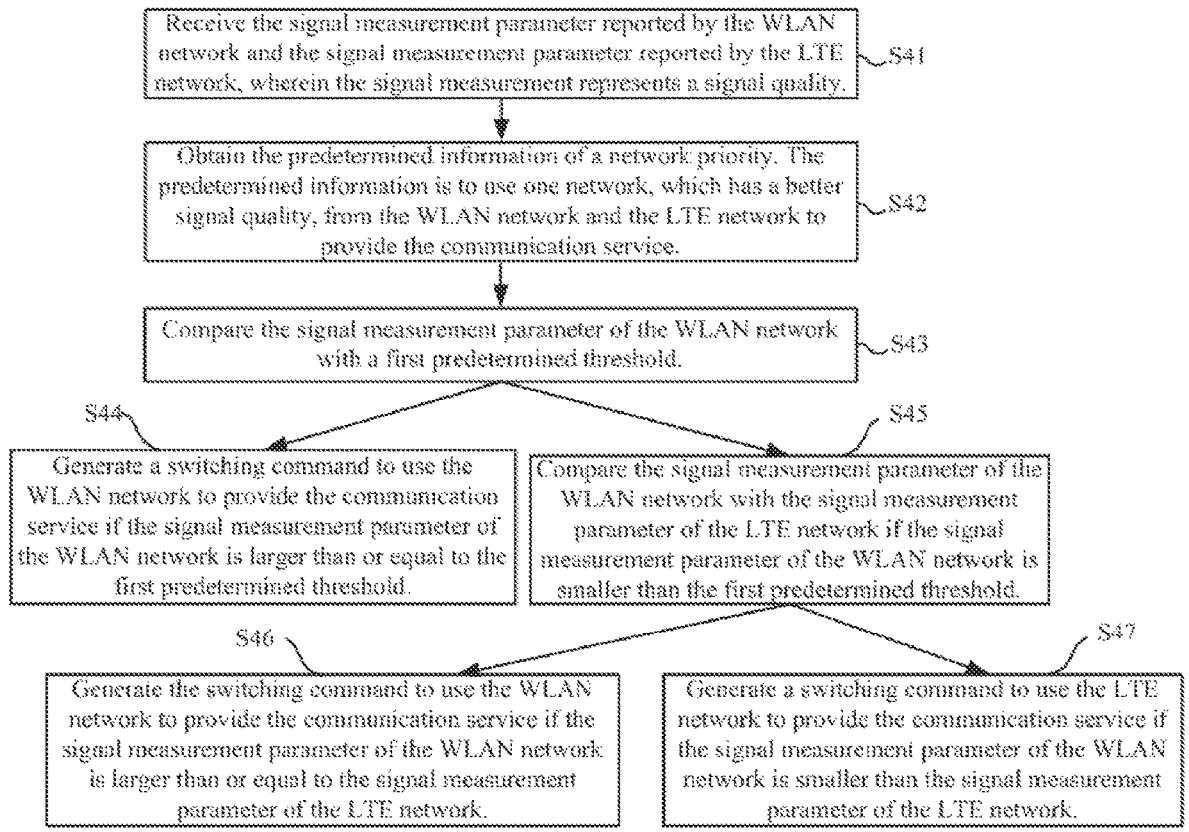
FIG. 4 is a flow chart showing a method for automatically switching the WLAN network and the LTE network according to a third embodiment of the present disclosure.
Figure 5:
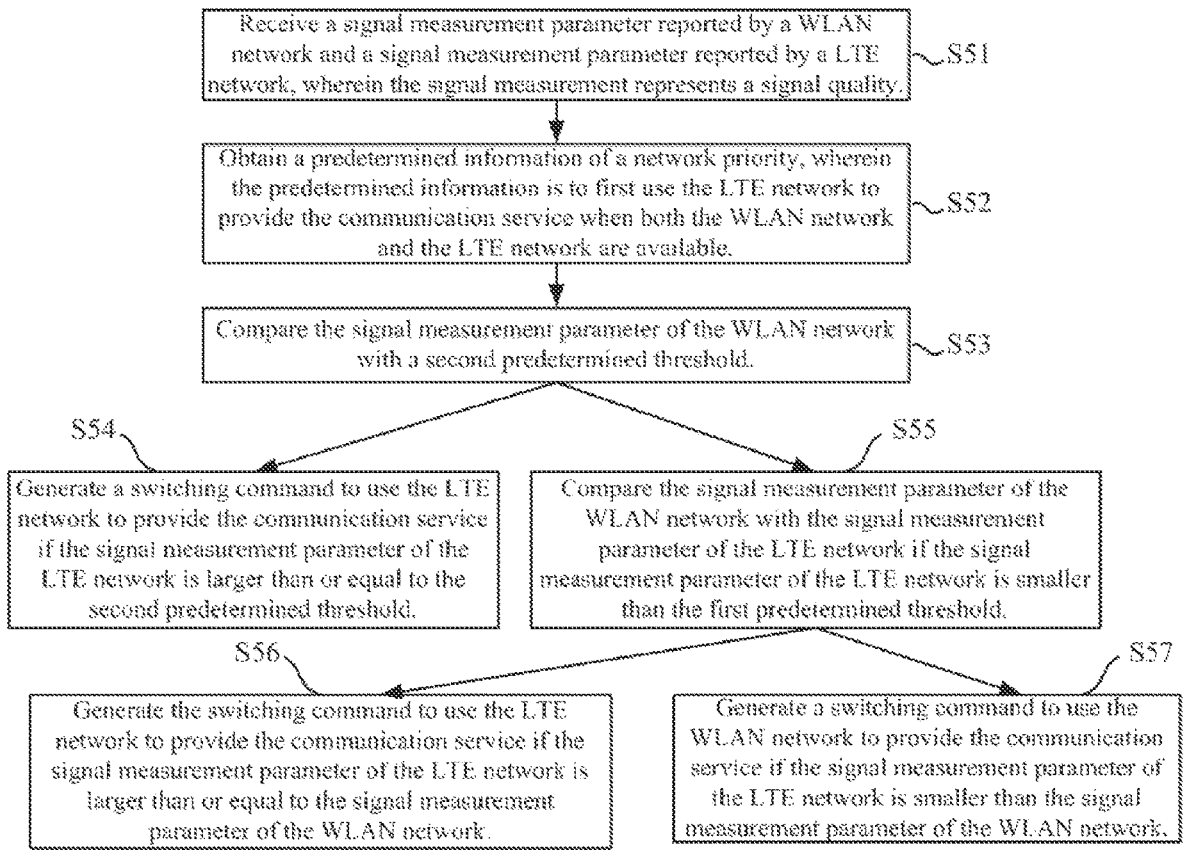
FIG. 5 is a flow chart showing a method for automatically switching the WLAN network and the LTE network according to a fourth embodiment of the present disclosure.

This embodiment utilizes the signal measurement parameters of the WLAN network and the LTE network as a basis to switching the networks. That is, this embodiment could evaluate the network conditions to select one of the WLAN network and the LTE network to provide the communication service (such as IMS communication service). In this way, this embodiment could select one network, which has a better network condition, from the WLAN network and the LTE network to provide the communication service. This ensures the communication service quality and raises the network connection efficiency. In the following disclosure, three kinds of predetermined information of the network priority shown in FIG. 3-FIG. 5 are used as examples to illustrate the switching methods and processes of the present disclosure.

Figure 3:
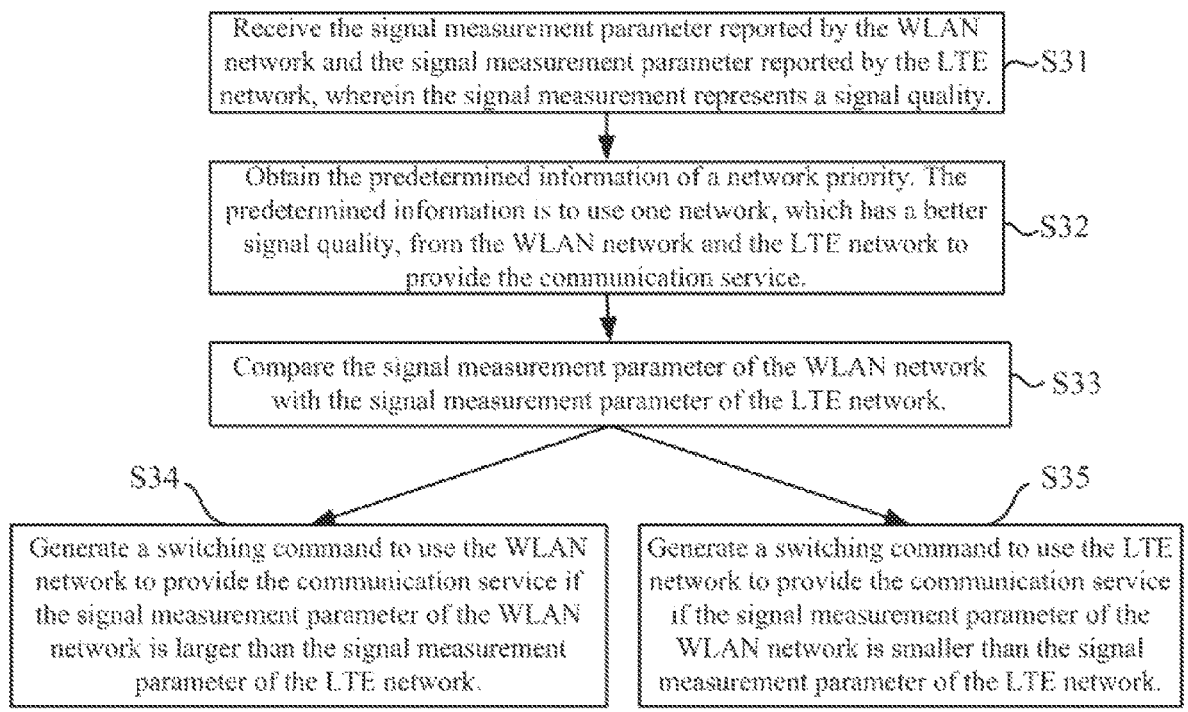
FIG. 3 is a flow chart showing a method for automatically switching the WLAN network and the LTE network according to a second embodiment of the present disclosure.

Please refer to FIG. 3. FIG. 3 is a flow chart showing a method for automatically switching the WLAN network and the LTE network according to a second embodiment of the present disclosure. When the predetermined information is the first predetermined information, it means that one network, which has a better signal quality, from the WLAN network and the LTE network is selected to provide the communication service. The method could comprise S31-S35.

S31: receive the signal measurement parameter reported by the WLAN network and the signal measurement parameter reported by the LTE network, wherein the signal measurement represents a signal quality.

S32: obtain the predetermined information of a network priority. The predetermined information is to use one network, which has a better signal quality, from the WLAN network and the LTE network to provide the communication service.

S33: compare the signal measurement parameter of the WLAN network with the signal measurement parameter of the LTE network.

S34: generate a switching command to use the WLAN network to provide the communication service if the signal measurement parameter of the WLAN network is larger than the signal measurement parameter of the LTE network.

S35: generate a switching command to use the LTE network to provide the communication service if the signal measurement parameter of the WLAN network is smaller than the signal measurement parameter of the LTE network.

This embodiment equivalently does not have a network priority. Instead, this embodiment selects a network having the best signal quality to replace a network having a worse signal quality to provide the communication service based on the signal measurement parameters.

In the condition that the signal measurement parameter of the WLAN network and the signal measurement parameter of the LTE network are not the same type, the two type of the signal measurement parameters need to be converted into the same type. That is, these signal measurement parameters should be converted to be represented by the same unit for comparison. For example, assume $Q\_LTE$ is the signal quality of the LTE network, $Q\_WLAN$ is the signal quality of the WLAN network, $M\_LTE$ is the signal measurement parameter of the LTE network, and $M\_WLAN$ is the signal measurement parameter of the WLAN. If $Q\_LTE=M\_LTE$, then $Q\_WLAN=M\_WLAN+C+Offset$, where C represents a difference between different units and Offset represents a self-defined variation. In other words, if the signal measurement parameter of the LTE network is used as a reference, then the value C and the variation Offset need to be introduced to convert the signal measurement parameter of WLAN such that the two signal measurement parameters could be represented by the same unit and thus could be compared with each other.

If the signal measurement parameter of WLAN network is smaller than the signal measurement parameter of the LTE network (that is, $Q\_WLAN<Q\_LTE$), then the LTE network should be used to provide the communication service. Therefore, if the WLAN network currently provides the communication service, then a switching command is generated to perform a switching operation to use the LTE network to provide the communication service. If the LTE network currently provides the communication service, then no switching operation is required and the LTE network continues to provide the communication service.

In contrast, if the signal measurement parameter of WLAN network is larger than the signal measurement parameter of the LTE network (that is, $Q\_WLAN>Q\_LTE$), then the WLAN network should be used to provide the communication service. Therefore, if the LTE network currently provides the communication service, then a switching command is generated to perform a switching operation to use the WLAN network to provide the communication service. If the WLAN network currently provides the communication service, then no switching operation is required and the WLAN network continues to provide the communication service.

Please refer to FIG. 4, which is a flow chart showing a method for automatically switching the WLAN network and the LTE network according to a third embodiment of the present disclosure. In this embodiment, the predetermined information of the network priority is the second predetermined information. That is, the user presets that the WLAN network is first used to provide the communication service when the WLAN network and the LTE network are both available, the method could comprises the following steps S41-S47.

S41: receive a signal measurement parameter reported by a WLAN network and a signal measurement parameter reported by a LTE network, wherein the signal measurement represents a signal quality.

S42: obtain a predetermined information of a network priority, wherein the predetermined information is to first use the WLAN network to provide the communication service when both the WLAN network and the LTE network are available.

S43: compare the signal measurement parameter of the WLAN network with a first predetermined threshold.

The first predetermined threshold could be understood as a predetermined value for determining whether the signal quality of the WLAN network is good or bad. This threshold value could be self-defined according to the user's demands.

S44: generate a switching command to use the WLAN network to provide the communication service if the signal measurement parameter of the WLAN network is larger than or equal to the first predetermined threshold.

If the signal measurement parameter of the WLAN network is larger than or equal to the first predetermined threshold (that is, $Q\_WLAN \geq$ the first predetermined threshold), this represents that the signal quality of the WLAN network is good to provide a good communication service.

Therefore, no switching operation is required because WLAN is currently used to provide the communication service.

S45: compare the signal measurement parameter of the WLAN network with the signal measurement parameter of the LTE network if the signal measurement parameter of the WLAN network is smaller than the first predetermined threshold.

If the signal measurement parameter of the WLAN network is smaller than the first predetermined threshold (that is, Q_WLAN<the first predetermined threshold), this represents that the signal quality of the WLAN network is not good and there is a risk to be disconnected from the network. Because the LTE network might not be currently better than the WLAN network, this embodiment further performs steps S46 and S47 to compare the signal measurement parameter of the WLAN network with the signal measurement parameter of the LTE network to select a network having a better quality to provide the communication service.

S46: generate the switching command to use the WLAN network to provide the communication service if the signal measurement parameter of the WLAN network is larger than or equal to the signal measurement parameter of the LTE network.

If the signal measurement parameter of the WLAN network is larger than or equal to the signal measurement parameter of the LTE network (that is, Q_WLAN≥Q_LTE), this represents that the WLAN network should be used to provide communication service. Because the WLAN is currently used to provide the communication service, no switching operation is required.

S47: generate a switching command to use the LTE network to provide the communication service if the signal measurement parameter of the WLAN network is smaller than the signal measurement parameter of the LTE network.

If the signal measurement parameter of the WLAN network is smaller than the signal measurement parameter of the LTE network (that is, Q_WLAN<Q_LTE), this represents that the LTE network should be used to provide communication service. Because the WLAN is currently used to provide the communication service, a switching operation is performed to use the LTE network to provide the communication service.

Please refer to FIG. 5, which is a flow chart showing a method for automatically switching the WLAN network and the LTE network according to a fourth embodiment of the present disclosure. In this embodiment, the predetermined information of the network priority is the third predetermined information. That is, the user presets that the LTE network is first used to provide the communication service when the WLAN network and the LTE network are both available, the method could comprises the following steps S51-S57.

S51: receive a signal measurement parameter reported by a WLAN network and a signal measurement parameter reported by a LTE network, wherein the signal measurement represents a signal quality.

S52: obtain a predetermined information of a network priority, wherein the predetermined information is to first use the LTE network to provide the communication service when both the WLAN network and the LTE network are available.

S53: compare the signal measurement parameter of the WLAN network with a second predetermined threshold.

The second predetermined threshold could be understood as a predetermined value for determining whether the signal quality of the LTE network is good or bad. This second threshold value could be self-defined according to the user's demands.

S54: generate a switching command to use the LTE network to provide the communication service if the signal measurement parameter of the LTE network is larger than or equal to the second predetermined threshold.

If the signal measurement parameter of the LTE network is larger than the second predetermined threshold (that is, Q_WLAN≥the second predetermined threshold), this represents that the signal quality of the LTE network is good to provide a good communication service. Therefore, no switching operation is required because the LTE network is currently used to provide the communication service.

S55: compare the signal measurement parameter of the WLAN network with the signal measurement parameter of the LTE network if the signal measurement parameter of the LTE network is smaller than the first predetermined threshold.

If the signal measurement parameter of the LTE network is smaller than the second predetermined threshold (that is, Q_LTE<the second predetermined threshold), this represents that the signal quality of the LTE network is not good and there is a risk to be disconnected from the network. Because the WLAN network might not be currently better than the LTE network, this embodiment further performs steps S56 and S57 to compare the signal measurement parameter of the WLAN network with the signal measurement parameter of the LTE network to select a network having a better quality to provide the communication service.

S56: generate the switching command to use the LTE network to provide the communication service if the signal measurement parameter of the LTE network is larger than or equal to the signal measurement parameter of the WLAN network.

If the signal measurement parameter of the LTE network is larger than or equal to the signal measurement parameter of the WLAN network (that is, Q_LTE≥Q_WLAN), this represents that the LTE network should be used to provide communication service. Because the LTE is currently used to provide the communication service, no switching operation is required.

S57: generate a switching command to use the WLAN network to provide the communication service if the signal measurement parameter of the LTE network is smaller than the signal measurement parameter of the WLAN network.

If the signal measurement parameter of the LTE network is smaller than the signal measurement parameter of the WLAN network (that is, Q_LTE<Q_WLAN), this represents that the WLAN network should be used to provide communication service. Because the LTE is currently used to provide the communication service, a switching operation is performed to use the WLAN network to provide the communication service.

Figure 6:
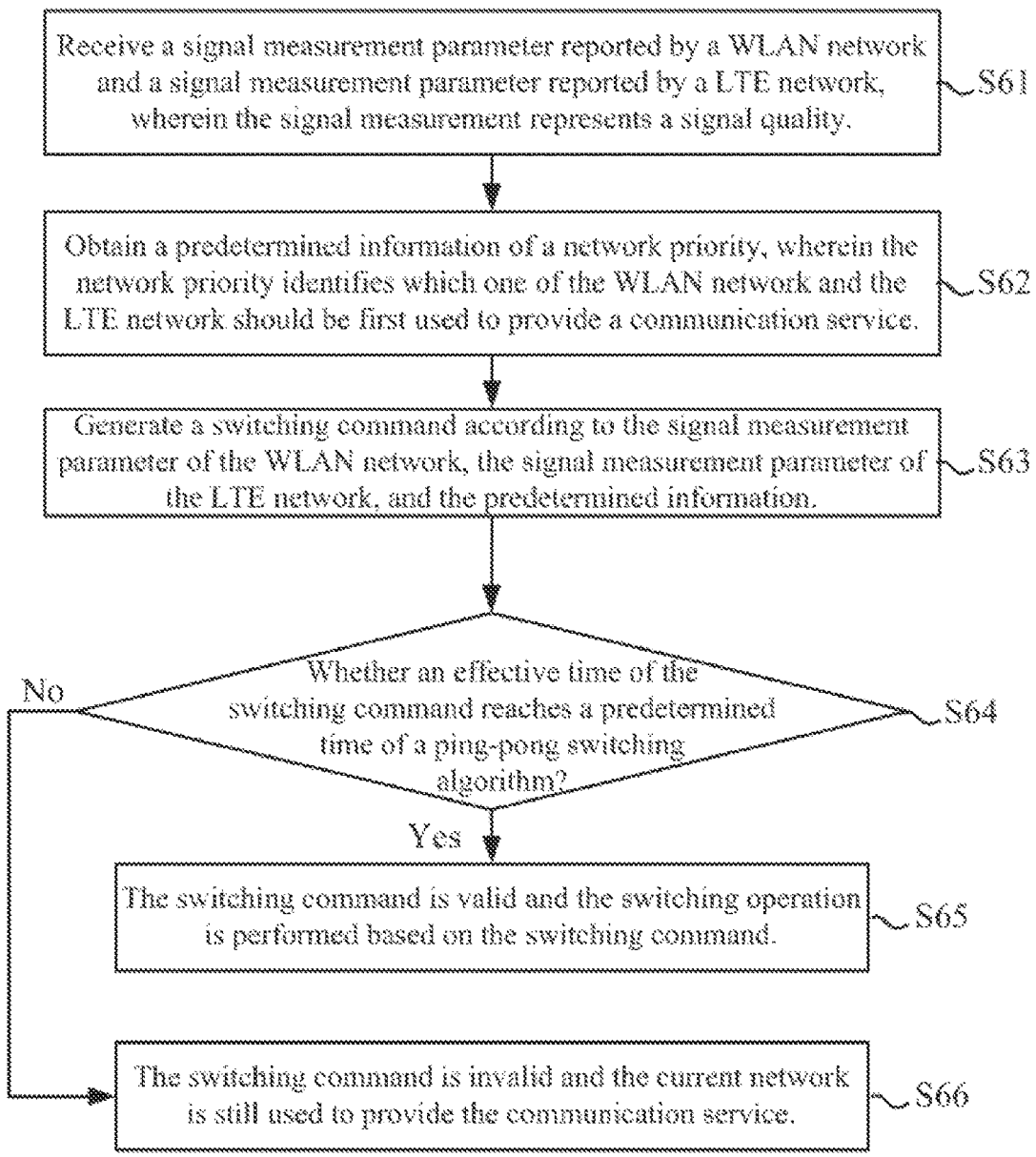
FIG. 6 is a flow chart showing a method for automatically switching the WLAN network and the LTE network according to a fifth embodiment of the present disclosure.

In order to prevent the communication service from being frequently switched between the WLAN network and the LTE network due to signal jittering, the present disclosure could execute a ping-pong switching algorithm to perform a network switching operation based on the embodiments shown in FIG. 3-FIG. 5. As shown in FIG. 6, the method comprises:

S61: receive a signal measurement parameter reported by a WLAN network and a signal measurement parameter reported by a LTE network, wherein the signal measurement represents a signal quality.

S62: obtain a predetermined information of a network priority, wherein the network priority identifies which one of the WLAN network and the LTE network should be first used to provide a communication service.

S63: generate a switching command according to the signal measurement parameter of the WLAN network, the signal measurement parameter of the LTE network, and the predetermined information.

The switching command in this embodiment comprises switching commands generated in embodiments shown in FIG. 3-FIG. 5.

S64: determine whether an effective time of the switching command reaches a predetermined time of a ping-pong switching algorithm.

The aforementioned effective time represents a time period of a triggering event for generating the switching command. The triggering event comprises the comparison result between the signal measurement parameter of the WLAN network and the signal measurement parameter of the LTE network, the comparison result between the signal measurement parameter of the WLAN network and the first predetermined threshold, and the comparison result between the signal measurement parameter of the LTE network and the second predetermined threshold.

Using the embodiment shown in FIG. 4 as an example, if the signal measurement parameter of the WLAN network is larger than or equal to the first predetermined threshold, the switching command is generated to continue using the WLAN network to provide the communication service. If the switching command is generated and ten seconds go by, the signal measurement parameter of the WLAN network becomes smaller than the first predetermined threshold and the signal measurement parameter of the WLAN network becomes smaller than the signal measurement parameter of the LTE network, then the LTE network should be used to provide the communication service instead of the WLAN network. Here, the switching command changes and the previous switching command for using the WLAN network to provide the communication service becomes invalid. Here, the "ten seconds" is the effective time.

In this embodiment, if a switching operation of a certain direction needs to be performed (for example, a switching operation needs to be performed to switch from the LTE network to the WLAN network), a timer for counting ten seconds is turned on. If the switching operation of the same direction occurs when the timer is counting, then this switching operation is ignored. If the switching operation of the opposite direction occurs after timer is counting, then this switching operation is performed.

The predetermined time of the ping-pong switching algorithm is predetermined as a threshold value to prevent the communication service from being frequently switched between the WLAN network and the LTE network due to signal jittering. This threshold value could be self-defined according to user's demands.

If the effective time of the switching command reaches the predetermined time of the ping-pong switching algorithm, then the switching command could be executed then the step S65 is performed. If the effective time of the switching command does not reach the predetermined time of the ping-pong switching algorithm, this represents that the switching command does not need to be executed and thus the step S66 is performed.

S65: The switching command is valid and the switching operation is performed based on the switching command.

S66: The switching command is invalid and the current network is still used to provide the communication service.

After the switching operation is performed, the present disclosure performs a registering operation according to the switched network. For example, if the switching operation is performed to use LTE network to provide the communication service, then the communication terminal activates the Public Data Network (PDN) connection with the LTE network and connects to the LTE network after completing Session Initiation Protocol (SIP) register. If the switching operation is performed to use the WLAN network to provide the communication service, then the communication terminal activates the evolved Packet Data Gateway (ePDG) connection with the WLAN network, activates the PDN connection, and connects to the WLAN network after the SIP register.

Please note, the embodiments shown in FIG. 1-FIG. 6 could be combined with each other and could be stored in an electronic device readable medium when the above-mentioned embodiments are implemented by software programs. That is, the present disclosure further provides a storage device, configured to store program codes capable of being executed to perform the above-mentioned embodiments. The storage device could be a USB drive, an optical disk, or a server. In other words, each of the above-mentioned embodiments could be implemented by software programs, which comprises multiple instructions. By executing these instructions, a smart terminal could perform some or all steps illustrated in these embodiments.

Figure 7:
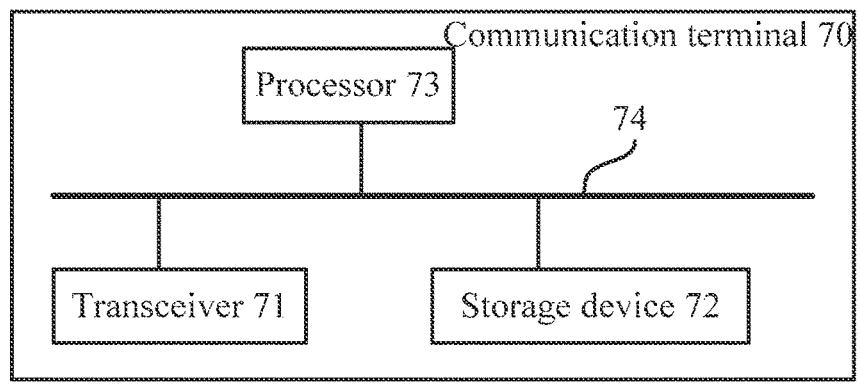
FIG. 7 is a diagram showing a communication terminal for automatically switching the WLAN network and the LTE network according to an embodiment of the present disclosure.

Please refer to FIG. 7, which is a diagram showing a communication terminal for automatically switching the WLAN network and the LTE network according to an embodiment of the present disclosure. The communication terminal 70 comprises a transceiver 71, a storage device 72, and a processor 73. The processor 73 could connect to the transceiver 71 and the storage device 72 via a bus 74.

The transceiver 71 is configured to receive a signal measurement parameter reported by a WLAN network and a signal measurement parameter reported by a LTE network, wherein the signal measurement represents a signal quality.

The storage device 72 is configured to store a predetermined information of a network priority, wherein the network priority identifies which one of the WLAN network and the LTE network should be used to provide a communication service.

The processor 73 is coupled to the transceiver and the storage device and is configured to perform a switching operation according to the signal measurement parameter of the WLAN network, the signal measurement parameter of the LTE network, and the predetermined information in order to select one of the WLAN network and the LTE network to provide the communication service.

The predetermined information could comprise one of a first predetermined information, a second predetermined information and a third predetermined information, the first predetermined information is to use one which has a better signal quality to provide the communication service, the second predetermined information is to first use the WLAN network to provide the communication service, the third information is to first use the LTE network to provide the communication service.

In a condition that the predetermined information is the first predetermined information, the processor 73 is configured to: compare the signal measurement parameter of the WLAN network with the signal measurement parameter of the LTE network; generate a switching command to use the WLAN network to provide the communication service if the signal measurement parameter of the WLAN network is larger than the signal measurement parameter of the LTE network; and generate a switching command to use the LTE network to provide the communication service if the signal measurement parameter of the WLAN network is smaller than the signal measurement parameter of the LTE network.

In a condition that the predetermined information is the second predetermined information, the processor 73 is configured to: compare the signal measurement parameter of the WLAN network with a first predetermined threshold; if the signal measurement parameter of the WLAN network is larger than or equal to the first predetermined threshold, then generate a switching command to use the WLAN network to provide the communication service; if the signal measurement parameter of the WLAN network is smaller than the first predetermined threshold, then compare the signal quality of the WLAN network with the signal quality of the LTE network; generate the switching command to use the WLAN network to provide the communication service if the signal measurement parameter of the WLAN network is larger than the signal measurement parameter of the LTE network; and generate the switching command to use the LTE network to provide the communication service if the signal measurement parameter of the WLAN network is smaller than the signal measurement parameter of the LTE network.

In a condition that predetermined information is the third predetermined information, the processor 73 is configured to: compare the signal measurement parameter of the LTE network with a second predetermined threshold; if the signal measurement parameter of the LTE network is larger than or equal to the second predetermined threshold, then generate a switching command to use the LTE network to provide the communication service; if the signal measurement parameter of the LTE network is smaller than the second predetermined threshold, then compare the signal quality of the WLAN network with the signal quality of the LTE network; generate the switching command to use the WLAN network to provide the communication service if the signal measurement parameter of the WLAN network is larger than the signal measurement parameter of the LTE network; and generate the switching command to use the LTE network to provide the communication service if the signal measurement parameter of the WLAN network is smaller than the signal measurement parameter of the LTE network.

In order to prevent the communication service from being frequently switched between the WLAN network and the LTE network due to signal jittering, the processor 73 is further used to determine whether the effective time of the switching command reaches a predetermined time of the ping-pong switching algorithm. If yes, then the processor 73 determines that the switching command is valid and executes the switching command. If not, the processor 73 determines that the switching command is invalid and thus the current network continues to provide the communication service.

The units disclosed in the communication terminal 70 correspondingly perform the methods in each of the embodiments and have similar technical effects.

Above are embodiments of the present disclosure, which does not limit the scope of the present disclosure. Any modifications, equivalent replacements or improvements within the spirit and principles of the embodiment described above should be covered by the protected scope of the invention.

What is claimed is:

1. A method for automatically switching between Wireless Local Area Network (WLAN) network and Long Term Evolution (LTE) network, comprising:

periodically receiving a signal measurement parameter reported by a WLAN network and a signal measurement parameter reported by a LTE network, wherein the signal measurement parameter reported by the WLAN network equals to a sum of signal quality of the WLAN network and a predefined variation, the signal measurement parameter reported by the LTE network equals to signal quality of the LTE network, and the WLAN network reports the signal measurement parameter more frequently than the LTE network;

obtaining a predetermined information of a network priority, wherein the network priority identifies which one of the WLAN network and the LTE network should be used to provide a communication service, the predetermined information comprises one of a first predetermined information, a second predetermined information and a third predetermined information, the first predetermined information is to use one which has a better signal quality to provide the communication service, the second predetermined information is to first use the WLAN network to provide the communication service, the third information is to first use the LTE network to provide the communication service;

in a condition that the predetermined information is the first predetermined information, comparing the signal measurement parameter of the WLAN network with the signal measurement parameter of the LTE network; generating a switching command to use the WLAN network to provide the communication service if the signal measurement parameter of the WLAN network is larger than the signal measurement parameter of the LTE network; and generating a switching command to use the LTE network to provide the communication service if the signal measurement parameter of the WLAN network is smaller than the signal measurement parameter of the LTE network;

in a condition that the predetermined information is the second predetermined information, comparing the signal measurement parameter of the WLAN network with a first predetermined threshold; if the signal measurement parameter of the WLAN network is larger than or equal to the first predetermined threshold, then generating a switching command to use the WLAN network to provide the communication service; if the signal measurement parameter of the WLAN network is smaller than the first predetermined threshold, then comparing the signal quality of the WLAN network with the signal quality of the LTE network; generating the switching command to use the WLAN network to provide the communication service if the signal measurement parameter of the WLAN network is larger than the signal measurement parameter of the LTE network; and generating the switching command to use the LTE network to provide the communication service if the signal measurement parameter of the WLAN network is smaller than the signal measurement parameter of the LTE network; and in a condition that predetermined information is the third predetermined information, comparing the signal measurement parameter of the LTE network with a second predetermined threshold; if the signal measurement parameter of the LTE network is larger than or equal to the second predetermined threshold, then generating a switching command to use the LTE network to provide the communication service; if the signal measurement parameter of the LTE network is smaller than the second predetermined threshold, then comparing the signal quality of the WLAN network with the signal quality of the LTE network; generating the switching command to use the WLAN network to provide the communication service if the signal measurement parameter of the WLAN network is larger than the signal measurement parameter of the LTE network; and generating the switching command to use the LTE network to provide the communication service if the signal measurement parameter of the WLAN network is smaller than the signal measurement parameter of the LTE network;

wherein after the step of generating the switching command, the method further comprises:

determining whether an effective time of the switching command reaches a predetermined time;

if the effective time of the switching command reaches the predetermined time, determining that the switching command is valid and performing the switching command; and if the effective time of the switching command does not reach the predetermined time, determining that the switching command is invalid and using a network that is currently providing the communication service to continue the communication service.

2. The method of claim 1, wherein the signal measurement parameter of the LTE network comprises at least one of a reference signal receiving power (RSRP) and a reference signal receiving quality (RSRQ) and the signal measurement parameter of the WLAN network comprises a received signal strength indicator (RSSI).

3. The method of claim 2, further comprising:
converting the signal measurement parameter of the LTE network and the signal measurement parameter of the WLAN network to be represented by a same unit, before the step of comparing the signal measurement parameter of the WLAN network with the signal measurement parameter of the LTE network.

4. A method for automatically switching between Wireless Local Area Network (WLAN) network and Long Term Evolution (LTE) network, the method comprising:

receiving a signal measurement parameter reported by a WLAN network and a signal measurement parameter reported by a LTE network, wherein the signal measurement parameter reported by the WLAN network equals to a sum of signal quality of the WLAN network and a predefined variation, the signal measurement parameter reported by the LTE network equals to signal quality of the LTE network;

obtaining a predetermined information of a network priority, wherein the network priority identifies which one of the WLAN network and the LTE network should be first used to provide a communication service; and performing a switching operation according to the signal measurement parameter of the WLAN network, the signal measurement parameter of the LTE network, and the predetermined information such that one of the WLAN network and the LTE network is selected to provide the communication service;

wherein the performing the switching operation according to the signal measurement parameter of the WLAN network, the signal measurement parameter of the LTE network, and the predetermined information comprises:

determining whether an effective time of the switching command reaches a predetermined time;

if the effective time of the switching command reaches the predetermined time, determining that the switching command is valid and performing the switching command; and if the effective time of the switching command does not reach the predetermined time, determining that the switching command is invalid and using a network that is currently providing the communication service to continue the communication service.

5. The method of claim 4, wherein the predetermined information comprises one of a first predetermined information, a second predetermined information and a third predetermined information, the first predetermined information is to use one which has a better signal quality to provide the communication service, the second predetermined information is to first use the WLAN network to provide the communication service, the third information is to first use the LTE network to provide the communication service.

6. The method of claim 5, wherein in a condition that the predetermined information is the first predetermined information, the step of performing the switching operation according to the signal measurement parameter of the WLAN network, the signal measurement parameter of the LTE network, and the predetermined information comprises:

comparing the signal measurement parameter of the WLAN network with the signal measurement parameter of the LTE network;

generating a switching command to use the WLAN network to provide the communication service if the signal measurement parameter of the WLAN network is larger than the signal measurement parameter of the LTE network; and generating a switching command to use the LTE network to provide the communication service if the signal measurement parameter of the WLAN network is smaller than the signal measurement parameter of the LTE network.

7. The method of claim 5, in a condition that the predetermined information is the second predetermined information, the step of performing the switching operation according to the signal measurement parameter of the WLAN network, the signal measurement parameter of the LTE network, and the predetermined information comprises:

comparing the signal measurement parameter of the WLAN network with a first predetermined threshold;

if the signal measurement parameter of the WLAN network is larger than or equal to the first predetermined threshold, then generating a switching command to use the WLAN network to provide the communication service;

if the signal measurement parameter of the WLAN network is smaller than the first predetermined threshold, then comparing the signal quality of the WLAN network with the signal quality of the LTE network;

generating the switching command to use the WLAN network to provide the communication service if the signal measurement parameter of the WLAN network is larger than the signal measurement parameter of the LTE network; and generating the switching command to use the LTE network to provide the communication service if the signal measurement parameter of the WLAN network is smaller than the signal measurement parameter of the LTE network.

8. The method of claim 5, in a condition that the predetermined information is the third predetermined information, the step of performing the switching operation according to the signal measurement parameter of the WLAN network, the signal measurement parameter of the LTE network, and the predetermined information comprises:
- comparing the signal measurement parameter of the LTE network with a second predetermined threshold;
- if the signal measurement parameter of the LTE network is larger than or equal to the first predetermined threshold, then generating a switching command to use the LTE network to provide the communication service;
- if the signal measurement parameter of the LTE network is smaller than the second predetermined threshold, then comparing the signal quality of the WLAN network with the signal quality of the LTE network;
- generating the switching command to use the WLAN network to provide the communication service if the signal measurement parameter of the WLAN network is larger than the signal measurement parameter of the LTE network; and
- generating the switching command to use the LTE network to provide the communication service if the signal measurement parameter of the WLAN network is smaller than the signal measurement parameter of the LTE network.

9. The method of claim 4, wherein the signal measurement parameter of the LTE network comprises at least one of a reference signal receiving power (RSRP) and a reference signal receiving quality (RSRQ) and the signal measurement parameter of the WLAN network comprises a received signal strength indicator (RSSI).

10. The method of claim 9, further comprising:
- converting the signal measurement parameter of the LTE network and/or the signal measurement parameter of the WLAN network to be represented by a same unit, before the step of comparing the signal measurement parameter of the WLAN network with the signal measurement parameter of the LTE network.

11. A communication terminal for automatically switching between Wireless Local Area Network (WLAN) network and Long Term Evolution (LTE) network, comprising:
- a transceiver, configured to receive a signal measurement parameter reported by a WLAN network and a signal measurement parameter reported by a LTE network, wherein the signal measurement parameter reported by the WLAN network equals to a sum of signal quality of the WLAN network and a predefined variation, the signal measurement parameter reported by the LTE network equals to signal quality of the LTE network;
- a storage device, configured to store a predetermined information of a network priority, wherein the network priority identifies which one of the WLAN network and the LTE network should be used to provide a communication service; and
- a processor, coupled to the transceiver and the storage device, configured to perform a switching operation according to the signal measurement parameter of the WLAN network, the signal measurement parameter of the LTE network, and the predetermined information in order to select one of the WLAN network and the LTE network to provide the communication service;
- wherein the processor is further configured to perform operations of:
- determining whether an effective time of the switching command reaches a predetermined time;
- if the effective time of the switching command reaches the predetermined time, determining that the switching command is valid and performing the switching command; and
- if the effective time of the switching command does not reach the predetermined time, determining that the switching command is invalid and using a network that is currently providing the communication service to continue the communication service.

12. The communication terminal of claim 11, wherein the predetermined information comprises one of a first predetermined information, a second predetermined information and a third predetermined information, the first predetermined information is to use one which has a better signal quality to provide the communication service, the second predetermined information is to first use the WLAN network to provide the communication service, the third information is to first use the LTE network to provide the communication service.

13. The communication terminal of claim 12, wherein in a condition that the predetermined information is the first predetermined information, the processor is configured to perform operations of:
- comparing the signal measurement parameter of the WLAN network with the signal measurement parameter of the LTE network;
- generating a switching command to use the WLAN network to provide the communication service if the signal measurement parameter of the WLAN network is larger than the signal measurement parameter of the LTE network; and
- generating a switching command to use the LTE network to provide the communication service if the signal measurement parameter of the WLAN network is smaller than the signal measurement parameter of the LTE network;
- wherein in a condition that the predetermined information is the second predetermined information, the processor is configured to perform operations of:
- comparing the signal measurement parameter of the WLAN network with a first predetermined threshold;
- if the signal measurement parameter of the WLAN network is larger than or equal to the first predetermined threshold, then generating a switching command to use the WLAN network to provide the communication service;
- if the signal measurement parameter of the WLAN network is smaller than the first predetermined threshold, then comparing the signal quality of the WLAN network with the signal quality of the LTE network;
- generating the switching command to use the WLAN network to provide the communication service if the signal measurement parameter of the WLAN network is larger than the signal measurement parameter of the LTE network; and
- generating the switching command to use the LTE network to provide the communication service if the signal measurement parameter of the WLAN network is smaller than the signal measurement parameter of the LTE network;
- wherein in a condition that the predetermined information is the third predetermined information, the processor is configured to perform operations of:
- comparing the signal measurement parameter of the LTE network with a second predetermined threshold;
- if the signal measurement parameter of the LTE network is larger than or equal to the first predetermined threshold, then generating a switching command to use the LTE network to provide the communication service;
- if the signal measurement parameter of the LTE network is smaller than the second predetermined threshold, then comparing the signal quality of the WLAN network with the signal quality of the LTE network;

generating the switching command to use the WLAN network to provide the communication service if the signal measurement parameter of the WLAN network is larger than the signal measurement parameter of the LTE network; and generating the switching command to use the LTE network to provide the communication service if the signal measurement parameter of the WLAN network is smaller than the signal measurement parameter of the LTE network.

14. The communication terminal of claim 11, wherein the signal measurement parameter of the LTE network comprises at least one of a reference signal receiving power (RSRP) and a reference signal receiving quality (RSRQ) and the signal measurement parameter of the WLAN network comprises a received signal strength indicator (RSSI).

15. The communication terminal of claim 14, wherein the processor is further configured to perform operations of:

converting the signal measurement parameter of the LTE network and the signal measurement parameter of the WLAN network to be represented by a same unit before the operation of comparing the signal measurement parameter of the WLAN network with the signal measurement parameter of the LTE network.

* * * * *